(12) United States Patent
Howarter et al.

(10) Patent No.: US 8,619,136 B2
(45) Date of Patent: *Dec. 31, 2013

(54) SYSTEM AND METHOD FOR HOME MONITORING USING A SET TOP BOX

(75) Inventors: Jamie C. Howarter, Overland Park, KS (US); Charles M. Lesher, Louisburg, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1379 days.

This patent is subject to a terminal disclaimer.

(21) Appl. No.: 11/607,186

(22) Filed: Dec. 1, 2006

(65) Prior Publication Data

US 2008/0129821 A1    Jun. 5, 2008

(51) Int. Cl.
*H04N 7/18*    (2006.01)

(52) U.S. Cl.
USPC .......... 348/143; 348/152; 348/153; 348/154; 348/155; 348/14.04; 340/506; 340/328; 340/330; 725/81; 725/84; 725/74; 725/110; 455/404; 379/167.05; 379/167.07

(58) Field of Classification Search
USPC ............... 348/143, 14.04, 152–155; 726/1; 340/328, 330, 506; 725/81, 84, 74, 725/110; 455/404; 379/167.05, 167.07
See application file for complete search history.

(56) References Cited

U.S. PATENT DOCUMENTS

| | | | | |
|---|---|---|---|---|
| 4,774,570 A | * | 9/1988 | Araki | 348/154 |
| 4,977,449 A | * | 12/1990 | Morgan | 725/74 |
| 5,428,388 A | * | 6/1995 | von Bauer et al. | 348/155 |
| 5,600,368 A | * | 2/1997 | Matthews, III | 348/143 |
| 5,657,076 A | * | 8/1997 | Tapp | 348/154 |
| 6,144,998 A | * | 11/2000 | Pisterzi | 725/109 |
| 6,476,858 B1 | * | 11/2002 | Ramirez Diaz et al. | 348/159 |
| 6,675,386 B1 | * | 1/2004 | Hendricks et al. | 725/105 |
| 6,753,774 B2 | * | 6/2004 | Pan et al. | 340/539.11 |
| 6,941,574 B1 | * | 9/2005 | Broadwin et al. | 725/37 |
| 7,015,943 B2 | * | 3/2006 | Chiang | 348/143 |
| 7,062,291 B2 | * | 6/2006 | Ryley et al. | 455/556.1 |
| 7,109,860 B2 | * | 9/2006 | Wang | 340/539.11 |
| 7,131,136 B2 | * | 10/2006 | Monroe | 725/105 |
| 7,218,338 B2 | | 5/2007 | McKnight et al. | |
| 7,746,223 B2 | | 6/2010 | Howarter et al. | |
| 7,839,446 B2 | * | 11/2010 | Hirano et al. | 348/333.09 |
| 8,321,885 B2 | * | 11/2012 | Pino et al. | 725/12 |
| 8,363,791 B2 | | 1/2013 | Gupta et al. | |
| 2002/0051059 A1 | * | 5/2002 | Shimizu et al. | 348/153 |
| 2002/0075407 A1 | * | 6/2002 | Cohen-Solal | 348/565 |
| 2002/0101347 A1 | * | 8/2002 | Mohri | 340/521 |
| 2003/0018975 A1 | * | 1/2003 | Stone | 725/105 |
| 2003/0023974 A1 | * | 1/2003 | Dagtas et al. | 725/47 |

(Continued)

OTHER PUBLICATIONS

Non-Final Rejection date mailed Feb. 10, 2009 in U.S. Appl. No. 11/607,526.

(Continued)

*Primary Examiner* — John Follansbee
*Assistant Examiner* — Anthony Mejia
(74) *Attorney, Agent, or Firm* — Swanson & Bratschun, L.L.C.

(57) ABSTRACT

A system and method for displaying security content from a set top box to a television. In one embodiment, the television receives media content for display. Security content from one or more wireless cameras replaces the media content in response to receiving an alert from the one or more wireless cameras.

19 Claims, 7 Drawing Sheets

(56) References Cited

U.S. PATENT DOCUMENTS

| | | | |
|---|---|---|---|
| 2003/0123435 A1 | 7/2003 | Yeom et al. | |
| 2003/0135860 A1* | 7/2003 | Dureau | 725/82 |
| 2003/0214930 A1 | 11/2003 | Fischer | |
| 2003/0227910 A1 | 12/2003 | Koyama | |
| 2004/0070620 A1* | 4/2004 | Fujisawa | 345/764 |
| 2004/0086093 A1* | 5/2004 | Schranz | 379/37 |
| 2004/0091089 A1 | 5/2004 | Wynn | |
| 2004/0153289 A1 | 8/2004 | Casey et al. | |
| 2004/0155961 A1* | 8/2004 | Litwin et al. | 348/155 |
| 2004/0227817 A1* | 11/2004 | Oya et al. | 348/155 |
| 2004/0233281 A1* | 11/2004 | Tolmei | 348/143 |
| 2005/0063404 A1* | 3/2005 | Karaoguz et al. | 370/418 |
| 2005/0080322 A1 | 4/2005 | Korman | |
| 2005/0111660 A1* | 5/2005 | Hosoda | 380/44 |
| 2005/0132420 A1* | 6/2005 | Howard et al. | 725/135 |
| 2005/0135570 A1 | 6/2005 | Binning | |
| 2005/0144024 A1 | 6/2005 | Wojton et al. | |
| 2005/0216949 A1* | 9/2005 | Candelora et al. | 725/134 |
| 2006/0063517 A1* | 3/2006 | Oh et al. | 455/415 |
| 2006/0174350 A1 | 8/2006 | Roever et al. | |
| 2006/0178138 A1 | 8/2006 | Ostroff et al. | |
| 2007/0162944 A1* | 7/2007 | Khare et al. | 725/113 |
| 2007/0288975 A1* | 12/2007 | Cashman et al. | 725/110 |
| 2008/0022322 A1* | 1/2008 | Grannan et al. | 725/78 |
| 2008/0030309 A1 | 2/2008 | Darrouzet | |
| 2008/0111684 A1* | 5/2008 | Zinser | 340/541 |
| 2008/0120639 A1* | 5/2008 | Walter et al. | 725/33 |
| 2008/0129498 A1 | 6/2008 | Howarter et al. | |
| 2008/0129821 A1 | 6/2008 | Howarter et al. | |
| 2008/0212746 A1* | 9/2008 | Gupta et al. | 379/38 |
| 2009/0051767 A1* | 2/2009 | Iwamura | 348/143 |
| 2009/0225750 A1 | 9/2009 | Hawkins | |

OTHER PUBLICATIONS

Response filed Mar. 3, 2009 to Non-Final Rejection dated Feb. 10, 2009 in U.S. Appl. No. 11/607,526.

Notice Regarding Non-Compliant/Non-Responsive Amendment dated mailed May 20, 2009 in U.S. Appl. No. 11/607,526.

Supplemental Response filed May 28, 2009 in U.S. Appl. No. 11/607,526.

Final Rejection date mailed Sep. 16, 2009 in U.S. Appl. No. 11/607,526.

Final Rejection and Examiner Interview Summary date mailed Nov. 17, 2009 in U.S. Appl. No. 11/607,526.

Response filed Feb. 1, 2010 to Final Rejection dated Nov. 17, 2009 in U.S. Appl. No. 11/607,526.

Terminal Disclaimer filed Feb. 10, 2010 in U.S. Appl. No. 11/607,526.

Notice of Allowance and Examiner Interview Summary date mailed Feb. 26, 2010 in U.S. Appl. No. 11/607,526.

U.S. Appl. No. 11/607,526; Issue Notification dated Jun. 9, 2010; 1 page.

U.S. Appl. No. 11/809,386; Final Rejection dated Apr. 11, 2012; 24 pages.

U.S. Appl. No. 12/119,256; Final Rejection dated May 4, 2012; 15 pages.

U.S. Appl. No. 12/119,256; Non-Final Rejection dated 02/06/: 20 pages.

Edward H. Frank et al., Connecting the home with a phone line network chip set, Pub. Year 2000; IEEE; 14 pages.

U.S. Appl. No. 12/044,792; Final Rejection dated Aug. 3, 2012; 33 pages.

U.S. Appl. No. 12/119,256; Notice of Allowance dated Oct. 10, 2012; 22 pages.

U.S. Appl. No. 12/044,792: Examiner Interview Summary dated Nov. 8, 2012; 12 pages.

U.S. Appl. No. 12/119,256; Issue Notification dated Jan. 9, 2013: 1 page.

U.S. Appl. No. 12/119,256; Office Communication dated Jan. 3, 2013 5 pages.

U.S. Appl. No. 12/044,792; Non Final Rejection dated Mar. 29, 2013; 44 pages.

\* cited by examiner

SYSTEM AND METHOD FOR HOME MONITORING USING A SET TOP BOX

BACKGROUND

Security systems employing cameras have long been used by businesses and other organizations as a way to provide security and privacy. Frequently, such security systems, require complex integrated systems with multiple monitors and a processing system or other elements for coordinating and controlling feeds and security content from the different cameras. Business security systems are often hardwired or may require installation during construction of the building. In many cases, security systems are not an easy add-on to a home. As a result, most security systems that use cameras are too complex and expensive for a user to implement in a home setting. Additionally, many after market security systems are not easily integrated into a home without appearing out-of-place or creating a poor aesthetic.

Home security is particularly important when the user needs to answer the doorbell, has small children, or is away from the home temporarily or for extended periods of time. Existing systems for viewing security content while in the home or at a remote location are often complex and unreliable. In many cases, a user may be required to use specialized security equipment that is not easily incorporated into a home environment. For example, the security system may require an exclusive data processing system and extensive wiring to function properly. In order to view security content a user may be inconveniently required to go to a room designated for the voluminous amounts of security hardware. As a result, existing security systems are not easily integrated and do not allow efficient access to security content in or away from the home. In most cases, it is impossible to know conveniently when security content has been recorded in or away from the home. Most users cannot justify using a home security system with cameras based on the limitations and overall cost.

SUMMARY

The present invention provides additional safety and security to users of set top boxes and wireless devices, a system and method for individuals to receive security content from wireless cameras. The use of such a system provides additional security to individuals by making security content more readily available both within the home and at remote locations.

The first embodiment includes a system and method for displaying security content from a set top box to a television. In the method the television receives media content for display. Security content from one or more wireless cameras replaces the media content in response to receiving an alert from the one or more wireless cameras.

The second embodiment includes a set top box for displaying content from a content provider. Display components may communicate the content to a television. A security module may send security content to the display components. The display components may include a transceiver for sending and receiving the security content from one or more wireless cameras and an interface for communicating the security content to the display components.

Yet another embodiment includes a method for displaying security content on a set top box. The method includes recording security content from a wireless camera in response to camera activity. The user receives an indication that the security content has been received. The security content is communicated to a display.

BRIEF DESCRIPTION OF THE DRAWINGS

Illustrative embodiments of the present invention are described in detail below with reference to the attached drawing figures, which are incorporated by reference herein.

DETAILED DESCRIPTION OF THE DRAWINGS

Certain embodiments of the present invention provide a system and method for automatically displaying security content received from wireless cameras by a set top box connected device or wireless device, such as a cell phone. Security content may include still pictures, video, video clips, streaming video, or other feeds, as viewed, recorded, or streamed by the wireless cameras or wired cameras. The security content is wirelessly displayed to the user for alerting the user of guests, intruders or other camera activity. The wireless camera may be constantly monitoring, or may monitor or record based on motion sensors, sounds, a doorbell, events, sensors, or other presence detection devices. The security content may be automatically displayed by the cell phone, a computer with an Internet connection, or to a display connected to the set top box. Alternatively, an alert may be generated before the security content is displayed to inform the user that security content is forthcoming or may be viewed at the option of the viewer.

Figure 1:
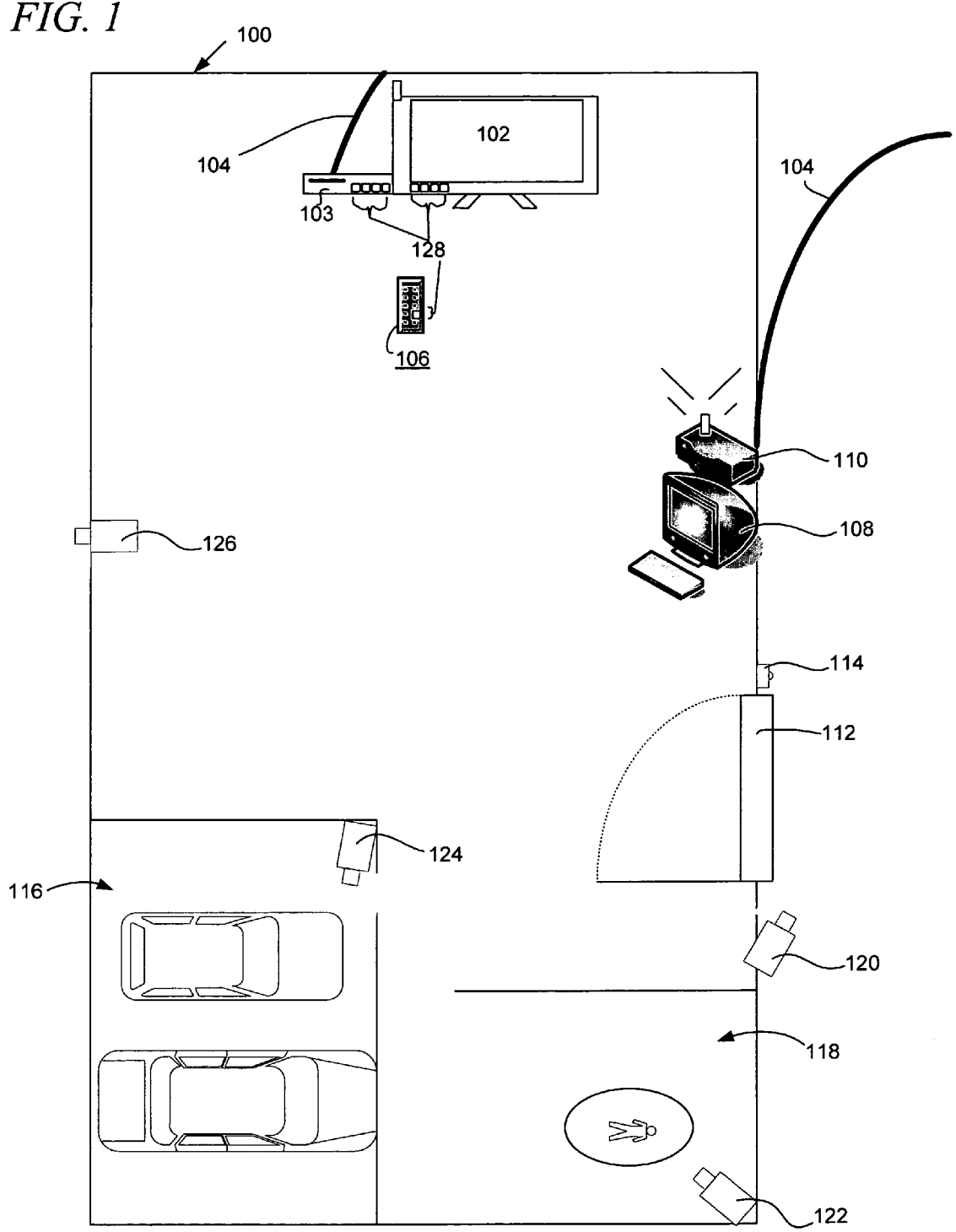
FIG. 1 is an illustration of a home using a set top box security system in accordance with the illustrative embodiments of the present invention.

FIG. 1 is an illustration of a home using a set top box security system in accordance with the illustrative embodiments of the present invention. The home 100 as shown in FIG. 1 is an example of a dwelling structure. In other embodiments, the home 100 may be a business or other structure where people live, work or otherwise congregate. The home 100 includes various security and communications components which may include a television 102, a set top box 103, a television connection 104, a remote control 106, a personal computer 108, a wireless router 110, a door 112, and a doorbell 114.

The television 102 is a display device that displays television content and programs. The television 102 may display either digital or analog signals. The television 102 may be a CRT monitor, an LCD television, an Internet protocol television, a plasma television, or other display device suitable for displaying images and media content to a user. The set top box 103 is a device for providing television and security content to the television. The set top box 103 may communicate information to the television 102 wirelessly or through a wired connection, such as an electrical or fiber connection. In one example, the set top box 103 is a cable box provided by a cable or satellite television/Internet provider. In another example, the set top box 103 is or may include an enhanced digital video recorder for displaying television content and recording and displaying security content as needed. The television connection 104 may be a hard wired line such as fiber-optic, DSL, cable, Ethernet, twisted-pair or other communication medium suitable for communicating data. The televisions connection 104 may alternatively be a wireless connection for receiving television content and security content. The data may be received from a satellite, cable, telephone, cellular, Internet service or other communications service provider. The set top box 103 may be used to select the normal viewing content, order programs, record programs, and control the television 102 as specified by the user.

The remote control 106 is a device that controls the content, performance and other functions of the television 102 and/or set top box 103. The personal computer 108 is a data processing system that executes programs and instructions. The wireless router 110 is a wireless base station that transmits and receives wireless signals. The doorbell 114 is a device for informing a user of the presence of an individual at the door 112 and may be touch, motion or presence sensitive. Home 100 may include any number of floors, rooms, layouts or configurations. A garage and a nursery are shown for describing one embodiment of the present invention.

The home 100 includes a number of wireless cameras including front door camera 120, nursery camera 122, garage camera 124, and backyard camera 126. Alternatively, the home 100 may include any number of hardwired cameras as an alternative to the wireless cameras. In one embodiment, the wireless cameras are backup or redundant cameras to hardwired cameras. The wireless cameras may also include night vision, infrared, electromagnetic, or thermal imaging. The description of wireless cameras and hardwired cameras may be used interchangeably in connection with the embodiments described herein. Each wireless camera is a visual communication device that communicates images, video, or streaming video wirelessly. Each wireless camera is positioned to view a different portion of the exterior or interior of the home 100. For example, the user may want to view the front door, nursery, garage and back yard for security or personal reasons. The user may prefer to monitor their child, an expensive vehicle, or a pool.

In one embodiment, a user programs the set top box 103 to display one or more of the wireless camera views or security content on one or more channels of the television 102. The process for establishing the channel is further described in FIG. 4. The set top box 103 includes camera view selectors 128 or camera buttons, for selecting which camera view to display. The television 102, the remote control 106 and other wireless devices may also include camera view selectors 128.

In one embodiment, the camera view or security content replaces regular viewing content of the television 102, such as a television show or DVD movie. The regular viewing content is the media typically received and displayed by the television 102 including content such as cable, satellite, video feeds, video inputs, and other data normally viewed by the user. The security content may be displayed to the user according to user preferences and configuration of the set top box 103. In one embodiment, the security content is temporarily displayed to the television 102 or displayed until the user takes some action or selects to return to the regular viewing content.

In another embodiment, the camera view is an overlay so that both a camera view and regular content may be viewed at the same time using differing levels of transparency. For example, when the doorbell 114 is pushed activating the front door camera 120, the camera view may be displayed transparently over a news program the user is watching so that both the news program and view from the front door camera 120 may be seen. In another embodiment, the regular viewing content and one or more camera views are displayed using a picture-in-picture (PIP) feature that is displayed simultaneously on the television 102. Some televisions displays may already have a channel designated for picture-in-picture display. When the set top box 103 receives security content, the set top box 103 may automatically change the channel of the television 102 to the designated channel or otherwise engage the picture-in-picture feature. The set top box 103 may also present the user the option to view the security content at the present or at a later point in time. The camera view selectors 128 may be the picture-in-picture button of the set top box 103, television 102, or the remote control 106. The user may use the remote control 106 and camera view selectors 128 to switch between camera views displayed on the television 102.

The set top box 103 may also be configured to power on the television 102 when the doorbell 114 is pushed. Alternatively, the set top box 103 may be configured by the user to flash the security content to the television 102 to attract the attention of a person in the home 100. The set top box 103 may also be configured to sound a special alert or to have the television 102 emit a specialized sound or signal indicating that live security content is or has been received. The set top box 103 may be connected to multiple televisions or displays which may be configured to display security content from the wireless cameras. For example, the television 102 may display a view of the nursery from the nursery camera 122.

In another embodiment, the set top box 103 may display a pop-up box or small indicator on the television 102 that informs the user that security content is being received or was previously recorded. For example, the pop-up box may be a small box with the caption "motion detected on camera 4 in the back yard." Alternatively, the pop-up box may indicate that "security content recorded @4:00 p.m. when the doorbell was pushed" and display a still or video image of the security content in the pop-up box. The pop-up box may be used to provide a security content display and capture system similar to voicemail in which captured or live security content may be selected and viewed based on a user request. For example, security content that was previously recorded may be viewed as desired by the user. The user may elect to view all security content at one time or as recorded using the set top box 103. The pop-up display may be used by the user to elect to view new security content or offer the user the opportunity to record or save the security content for delayed viewing at a later time.

In one embodiment, a camera view is automatically displayed by the set top box 103 to the television 102 based on activity at one of the cameras. For example, the front door camera 120 and the back yard camera 126 may be motion sensitive. As a result, the camera views from the front door camera 120 and the back yard camera 126 are displayed on the television 102 automatically. In another embodiment, the wireless camera view of the front door camera 120 is displayed on the television 102 and a user's cell phone in response to an individual engaging the doorbell 114. This allows a user viewing the television to be automatically alerted to the presence of an individual at the door 112. The front door camera 120 functions as an electronic peep hole for validating identity before authorizing entry into the home 100. The wireless cameras of FIG. 1 may communicate with the set top box 103, the television 102 and the personal computer 108. In one embodiment, the set top box 103 the personal computer 108, the wireless router 110 and the wireless cameras communicate using an 802.11 standard. However, these wireless devices may communicate using Bluetooth® or other communications protocols suitable for short-range wireless data transfer.

In another embodiment, the wireless cameras may stream security content to the wireless router 110 and the personal computer 108. The security content received from the front door camera 120 may be saved on the set top box 103, a hard drive of the personal computer 108, a separate digital video recorder (DVR) connected to the television 102, a network based DVR or to the television 102 itself. For example, the security content from the front door camera 120 may be streamed through the television connection 104 to a network based DVR for storage. In another embodiment, the security content may be streamed from the set top box 103 to a secured website for recording the security content. As a result, the customer could log in using a password and view security content recorded at the home 100 or being streamed live to the home 100 at any time.

The set top box 103 may also send an email, SMS, or other form of text, graphic, video, or other message to a mobile device through an internet protocol network and a wireless network. For example, the user may establish preferences for sending security content, security content alerts, or recorded security content to specified email, instant messaging identifications, or text message accounts. The user may further specify that only security content activity detected from specified cameras, such as the back door camera 126, is to be sent in an email message. The security content may be sent by the set top box 103 as an attachment, streaming data, an alert, or a link to download information from the set top box 103 or a secure server.

The features of one embodiment of the present invention are particularly useful because a user viewing the television 102 may selectively view security content from any of the wireless cameras using the camera view selectors 128. In one embodiment, the camera view selectors 128 are selection devices or indicators designated specifically for selecting which camera view to display on the television 102. However, the camera view selectors may be any mechanical or electronic indicator suitable for selecting a channel on the television 102, the remote control 106, or cell phone. The camera view selectors 128 may have default values for each of the wireless security cameras or may be programmed by a user based on individual preferences and the number of wireless security cameras in the home 100.

The television 102 may be connected to any number of peripheral devices for displaying alternative content. For example, the television 102 may be connected to a gaming system, a media system such as a digital video player, digital video recorder or any other device that streams television content or media to the television 102. In one example, a user is watching the television 102. As an individual approaches the door 112 and touches the doorbell 114, the set top box 103 receives a wireless signal from the front door camera 120 that displays the camera view of the individual, such as a package delivery person, on a portion of the television 102. As previously described, the image or security content displayed by the front door camera 120 may encompass the entire viewing display of the television 102, or a portion, such as a window in the upper right hand corner of the television 102, based on defined user preferences. As a result, the user may determine whether to open the door 112 either manually or using a button on the set top box 103, television 102, or remote control 106 to automatically disengage locks or otherwise open or permit access through an entrance based on the content displayed from the front door camera 120 to the television 102. The user may also use the security content displayed to the television 102 to selectively answer the door to avoid salespeople, pesky neighbors, or other unwanted visitors.

In another example, the user may have a small child in the nursery 118. The user may utilize the remote control 106 and corresponding camera view selectors 128 to view the security content displayed by the nursery camera 122. This allows the user to verify the status of a child in the nursery 118 without disturbing the child by opening a door or otherwise entering the room. In yet another example, the user may set preferences on the television 102 to intermittently or randomly display security content from the front door camera 120, the nursery camera 122, the garage camera 124, and the back yard camera 126 in the upper right hand corner of the television 102. This feature allows a user to check the security status of the house 100 without significantly interrupting normal content viewing.

Figure 2:
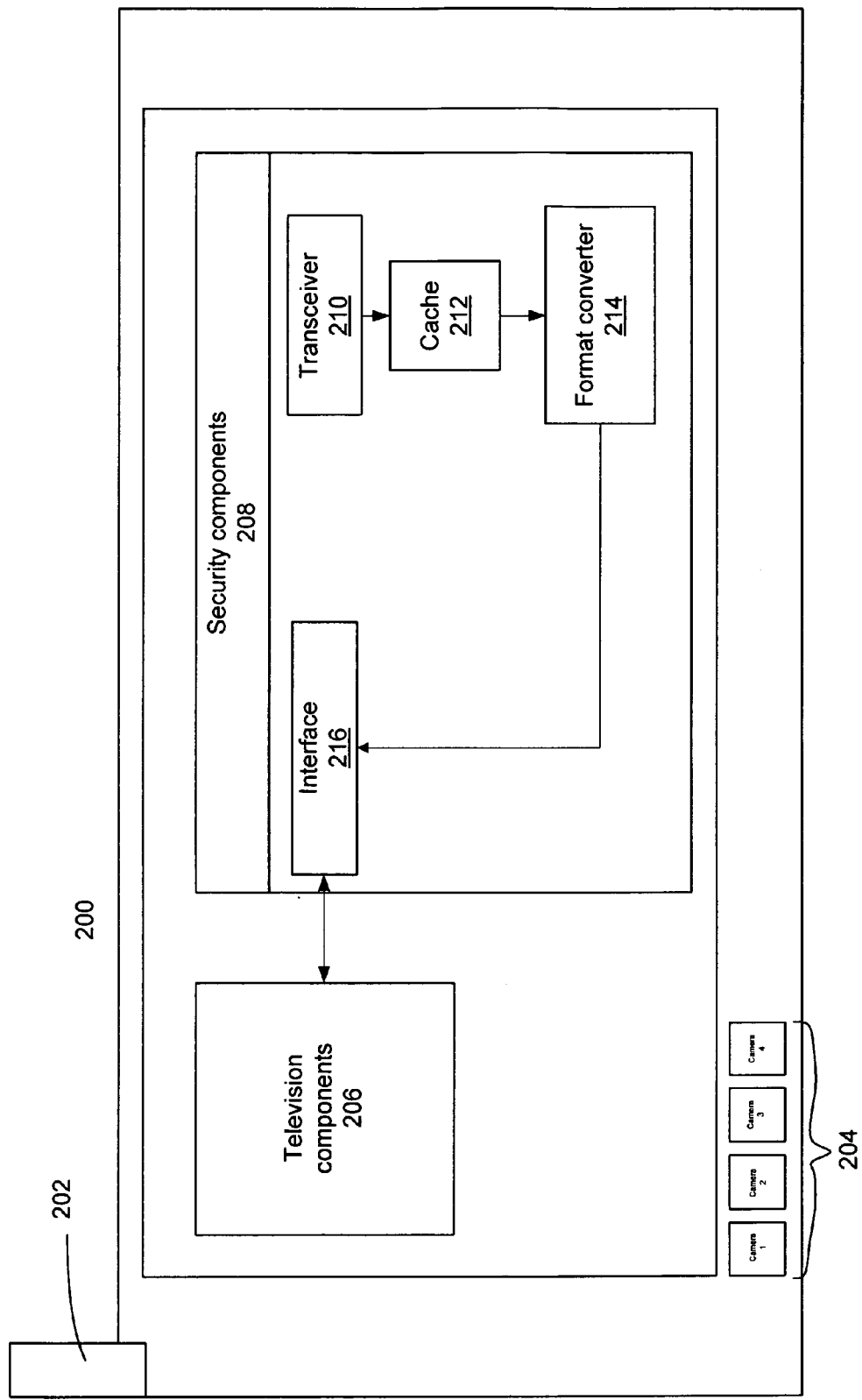
FIG. 2 is a block diagram of a set top box in accordance with the illustrative embodiments of the present invention.

FIG. 2 is a block diagram of an television in accordance with the illustrative embodiments of the present invention. The set top box 200 of FIG. 2 includes various components and modules. The set top box 200 is one implementation of the set top box 103 of FIG. 1. The set top box 200 of FIG. 2 includes various physical components which may include a wireless antenna 202, and camera view selectors 204. The wireless antenna 202 is the communication element for sending and receiving signals from wireless cameras, a router, a personal computer, a cell phone, a doorbell, a home network, and other wireless communication devices in the home. Camera view selectors 204 are a particular implementation of camera view selectors 128 described relative to FIG. 1. The set top box 200 may also be hardwired to a home network using cable, Ethernet, fiber optics, telephone, or other wiring schemes. In addition, the set top box 200 includes various internal components including television components 206, and security components 208.

The television components 206 are the components that allow the set top box 200 to display regular media content such as cable, satellite, video feeds, or other media frequently displayed on a set top box 200. The television components 206 may include elements, such as a tuner, hard disk for recording or downloading media, circuitry, memory, and a processor used to display media and other content to the user. The security components 208 are those components used to display the security content as herein described. The security components 208 include a transceiver 210, a cache 212, a format converter 214, and an interface 216.

The transceiver 210 works in conjunction with the wireless antenna 202 to transmit and receive signals from wireless cameras, such as front door camera 120 of FIG. 1. The transceiver 210 may use any communications protocol or media to transmit wireless information to the wireless cameras and to a personal computer or wireless router, such as the personal computer 108 and the wireless router 110 of FIG. 1. This allows the user to control the content and configuration of media that is streamed to the set top box 200.

The cache 212 may be a memory storage device for buffering or otherwise storing data received through the transceiver 210. The data or security content is stored in the cache 212 and then transferred to the format converter 214. In one embodiment, the format converter 214 is a program that converts the security content sent by the wireless cameras to a format that is properly displayed on a display in communication with the set top box 200. However, the format converter 214 may be a hardware device such as a video card or specially designed integrated circuit, or other software application suitable for converting the security content sent by the wireless cameras to a format that is displayable using the set top box 200.

The formatted security content is sent from the format converter 214 to the interface 216. In one embodiment, the interface 216 interconnects the security components 208 and the television components 206. The interface 216 ensures that the data is properly displayed to the television and user according to the preferences already established. For example, the preferences may set whether security content altogether replaces normal viewing is displayed in multiple windows, or is shown using varying levels of transparency.

The set top box 200 may include any number of camera view selectors 204. The camera view selectors 204 are configured to display a wireless camera view or security content from a wireless camera when activated. For example, the user may program the set top box 200 to display images from a front door camera when a first button is pushed. The user may also program other buttons or indicators that are part of the camera view selectors 204 to display views from other wireless cameras based on user preferences and personal or security needs.

Figure 3:
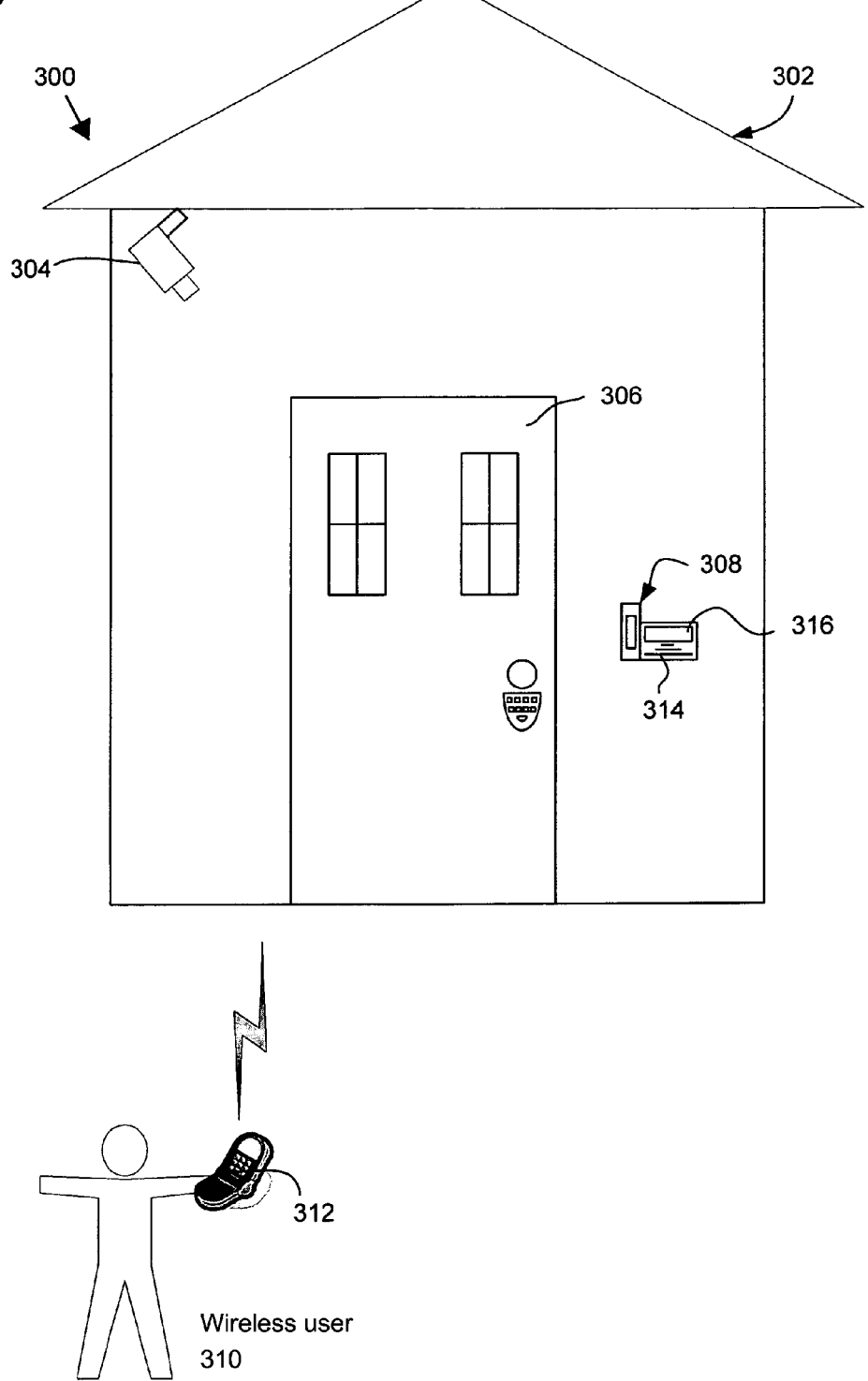
FIG. 3 is an exemplary security system working in connection with a cell phone in accordance with the illustrative embodiments of the present invention.

FIG. 3 is an exemplary security system working in connection with a cell phone in accordance with the illustrative embodiments of the present invention. A security system 300 of FIG. 3 includes various elements. In one embodiment, the security system 300 includes a home 302, a front door camera 304, a door 306, a doorbell 308, a wireless user 310, and a cell phone 312. The home 302 is a building, such as the home 100 of FIG. 1. In one embodiment, the home 302, and the wireless user 310 are in different geographic locations. The security system 300 of FIG. 3 allows the wireless user 310 to view security content from the front door camera 304 despite being in a different geographic location. The front door camera 304 is a camera, such as front door camera 112 of FIG. 1.

The doorbell 308 may be a smart device including a processor, memory, antenna, wireless transceiver and other components for implementing the features herein described. The doorbell 308 may be hardwired to power and communications lines of the home 302. Alternatively, the doorbell 308 may be a battery powered and self-contained wireless unit. The doorbell 308 communicates with the front door camera 304 and other wireless devices, such as the wireless router 110 of FIG. 1 for sending and receiving data. For example, when the doorbell 308 is pushed or activated by an individual, the doorbell may instruct the front door camera to stream live data, record a video, or take a still image of the person at the door 306 to send to the cell phone 312 or the set top box 103 of FIG. 1. The doorbell 308 may be equipped to send and receive network signals directly or through broadcast devices using protocols such as Bluetooth®, WiFi, WiMAX™, CDMA, GSM, and other wireless protocols and standards.

In one embodiment, the doorbell 308 may include a speaker 314 and display 316. The speaker 314 or the front door camera 304 may be equipped with a microphone for communicating information from an individual present at the door 306 to the wireless user 310. The speaker 314 may use Internet Protocol telephony to send a voice signal to the cellular phone 312. The speaker 314 may also use voice recognition to determine the identity of the individual pressing the doorbell 308. For example, the doorbell 308 may prompt a user to read a specified phrase, give a password, or "Say your name." The doorbell 308 may use voice recognition to send a predefined alert, chime or signal to the cell phone 312. For example, the user may program the doorbell to play "The boys are back in town" to the cell phone 312 anytime the voice or image of a son of the family is identified. Alternatively, the user may designate different ring tones, songs, or other audio messages based on the individual recognized at the doorbell 308. Such ring tones, songs, and audio messages may be stored on the cell phone 312 and triggered for playing on the cell phone 312 when an individual is identified by the doorbell 308.

The display 316 is a graphical interface for sending and receiving information from the doorbell 308. The display 316 may display text, video, graphics, and other streaming or recorded data. The display 316 may also include a touch screen or text pad for typing words and numbers. In one embodiment, the display 316 may also be integrated with the front door camera for recording images directly from the doorbell 316 and image recognition. In another embodiment, the display 316 is used to display a text message sent by the wireless user 310 using the cell phone 312. However, the display 316 may be any device suitable for displaying content or a graphical representation from the cell phone 312. In another example, the wireless user 310 may send streaming video of himself/herself to be displayed by the display 316 of the doorbell 308, such as telling girl scouts to come back later to deliver an order of cookies. The doorbell 308 may have an identifier, such as an email address, messaging identifier, or text identification for sending messages directly to the doorbell 308.

In one example, the wireless user 310 may use the cell phone 312 to transmit an image or video of the wireless user 310 authorizing an individual present at the door 306 to leave a package at the door step. The security system 300 of FIG. 3 may be used in various manners. In one embodiment, an individual may approach the home 302 and press the doorbell 308. A wireless signal is sent from the doorbell 308 to the cell phone 312. In one embodiment, the wireless signal from the doorbell 308 may be sent through a wireless router such as wireless router 110 of FIG. 1. In another embodiment, a wireless signal may be sent from the doorbell 308 through a personal computer 108 of FIG. 1 and transmitted via a wireless connection to the cell phone 312. An alert or security content from the front door camera 304 is then displayed to the wireless user 310 on the cell phone 312.

In one embodiment, the cell phone 312 is a cell phone equipped to receive streaming video, pictures or other content. However, the cell phone 312 may be any wireless communication element or device suitable for receiving wireless communications. The wireless user 310 may use the security content from the front door camera 304 to view individuals present at the home 302. Alternatively, the wireless user 310 may use the security content displayed on the cell phone 312 to unlock or otherwise grant access to the home 302 through the door 306. In one embodiment, the doorbell 308 and the door 306 may electronically interface to allow the door 306 to be opened remotely. In another example, the wireless user 310 may receive security content indicating that the spouse of the wireless user 310 is present at the door 306 but does not have keys to the home 302. The wireless user 310 may push a button on the cell phone 312 or otherwise send a signal that unlocks the door 306 or otherwise grants access to the home 302.

The security content from the front door camera 304 is displayed to the user automatically using different methods. In one embodiment, the security content is transmitted to the wireless user 310 once the doorbell 308 has been activated or pushed. In another embodiment, the security content is sent from the front door camera 304 to the cell phone 312 based on a motion sensing mechanism of the front door camera 304. For example, if the front door camera 304 detects a prowler, the motion sensor of the front door camera 304 automatically transmits a video clip of the prowler to the cell phone 312. The wireless user 310 may use the security content to call the police or take other security measures to protect the home 302. The security content may be displayed to the user 310 on one or more displays of the cell phone 312.

The cell phone 312 may chime, ring, emit a tone, vibrate or otherwise indicate to the wireless user 310 that security content is being received from the front door camera 304 or in response to the doorbell 308 being pressed. In one embodiment, the wireless user 310 may link specific chimes, ring tones, or cell phone 312 actions with the doorbell 308 or other security cameras. For example, when the doorbell 308 is pushed the cell phone 312 may make a door bell sound, such as "ding dong." When the cell phone 312 receives a signal from a back door camera, the cell phone may play a designated song. This feature lets the wireless user 310 be alerted to the doorbell 308 even if the home 302 is very large or the wireless user 310 is in the backyard or at a remote location. Additionally, the use may have different doorbells at different locations such as home, home office, apartment, art studio, workshop, or work address. Each doorbell may have a distinct ring tone, song, chime or other cell phone indicator for indicating the presence of an individual.

The cell phone 312 may also receive a textual confirmation of a camera identifier of the wireless camera. The camera identifier is a name, number or other text identifier assigned by default or by the user that identifies the wireless camera and may identify the location of the wireless camera. For example, the camera identifier accompanying a still or video image may state, "Camera 1—Front Door Camera." This function may be particularly useful when the wireless user 310 has multiple wireless cameras installed in the home 302, such as home 100 of FIG. 1. The security content sent from the front door camera 304 may be video clips, still images, or streaming data, as requested by the user. Security content received by the cell phone 312 may be received as a text message, voicemail, or phone call. In one embodiment, an icon and alert may be displayed to the phone indicating that security content is being uploaded to the phone. The security content may also be stored on a cellular network for access by the wireless user 310 at a time and place of convenience. In yet another embodiment, the security content may be downloaded directly from the set top box to the cell phone when requested by the wireless user 310.

The wireless user 310 may use the cell phone 312 to configure how the security content is received and displayed to the wireless user 310. For example, the wireless user 310 may select to automatically display the security content including streaming data, video, or photos to the cell phone 312 when received. Alternatively, the wireless user 310 may select to first receive an alert and then based on the alert, the wireless user may manually elect whether or not to display the data. As previously mentioned, the alert may be linked to specific devices.

Figure 4:
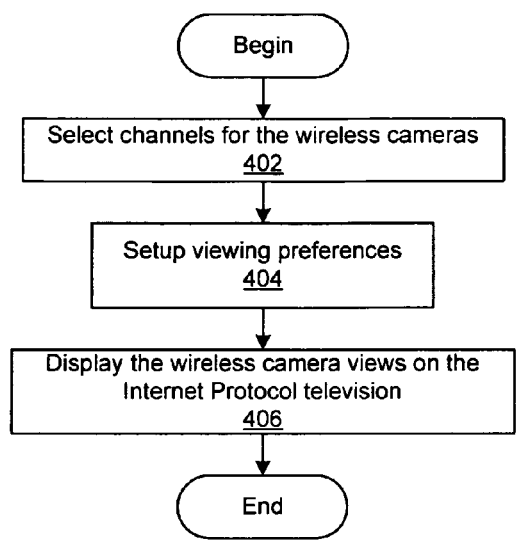
FIG. 4 is a flow chart for a process for establishing preferences for a set top box in accordance with the illustrative embodiments of the present invention.

FIG. 4 is a flow chart for a process for establishing preferences for a set top box in accordance with the illustrative embodiments of the present invention. The process of FIG. 4 is used to establish preferences and a configuration for a set top box for viewing security content from a wireless camera and a television. A user may be prompted to complete this process each time a new wireless security camera is detected by the television, or manually, as selected by the user. For example, when a new camera is installed, a user may be prompted to complete the process of FIG. 4 using a set top box and a television.

The process of FIG. 4 begins by selecting channels for the wireless camera [Step 402]. For example, the user may elect to use a channel, such as channel 99 to view the security content from the wireless camera. The security content from the one or more wireless security cameras may be displayed on a single channel mosaic or on multiple channels. In one embodiment, content from up to six wireless cameras may be displayed on a single channel. Channels that are unused by the user for regular television content may be blocked or otherwise dedicated to display security content from the security cameras. For example, a front door camera, a nursery camera, a garage camera, and a back yard camera may be configured so that the content is displayed on channels 100, 101, 102, and 103 of the television. Additionally, all recorded security content captured may be viewed at a later time on channel 104.

Next, the process sets viewing preferences [Step 404]. The preferences may include any number of preferences and configurations for displaying security content. In one embodiment, camera selection buttons are assigned to each of the wireless security cameras and the user establishes how the security content is displayed to the television. For example, security content may be shown transparently over the normal viewing content of the television, such as a cable television program.

In another embodiment, the user may set viewing preference so that security content fully replaces the normal viewing content of the television. For example, as the user is watching a movie, activity detected by one of the wireless cameras may trigger the television to display only the relevant security camera until the user selects to return to normal viewing. Viewing preferences may also specify which camera selection indicators are used by the remote control and how the user may change between security content of the different security cameras. The set top box may also be configured to use a picture-in-picture configuration for displaying security content to the user.

During step 404, the user may also configure the set top box to send an alert to other devices through a wired connection or wirelessly to indicate that security content is being received or was previously recorded. For example, the user may enter a text message address allowing the set top box to send messages to a cell phone when live security content is received from a front door camera.

Next, the process displays the camera views on the television [Step 406] with the process terminating thereafter. The views are displayed in Step 406 to allow the user to verify that the security content is displayed in accordance with the pre-established viewing preferences. Additionally, showing the camera views allows the user to verify that the one or more wireless cameras are functioning properly and displaying security content that is relevant and useful.

Figure 5:
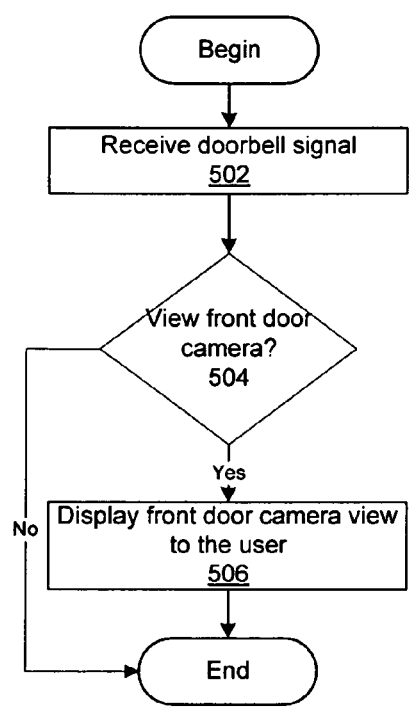
FIG. 5 is a flow chart of a process for security system interactions in accordance with the illustrative embodiments of the present invention.

FIG. 5 is a flow chart of a process for security system interactions in accordance with the illustrative embodiments of the present invention. The process of FIG. 5 may be implemented by a home security system on a set top box. The process begins by receiving a doorbell signal [Step 502]. The doorbell signal may be transmitted directly to the set top box using a wireless transmission protocol. For example, as a user selects or pushes the doorbell, a WiMAX™ signal may be sent from the doorbell and received by the set top box.

Next, the process determines whether to view the front door camera [Step 504]. The determination of Step 504 is made by a user based on information received through the television. For example, once the doorbell signal is received in Step 502, an alert, indicator, or pop-up box may be flashed to the user on the television. The alert may state the camera has detected activity, a camera identifier such as backyard camera—camera 4, and how the camera was activated, such as "doorbell" or "motion sensor." At that point, the user may press a button on a remote control, the set top box, or on the television itself, to select to view the front door camera.

If the process determines to view the front door camera, the process displays the camera view to the user [Step 506]. The camera view is the security content streamed or otherwise recorded by the wireless security camera. The camera view may be displayed on the television according to user preferences established by the user in a process such as FIG. 4. If the process determines not to view the front door camera in Step 504, the process terminates. FIG. 5 allows a user to interactively use security content from wireless cameras to better provide security and personal needs. In another embodiment, the security content is automatically displayed by the set top box to the television without user interaction.

Figure 6:
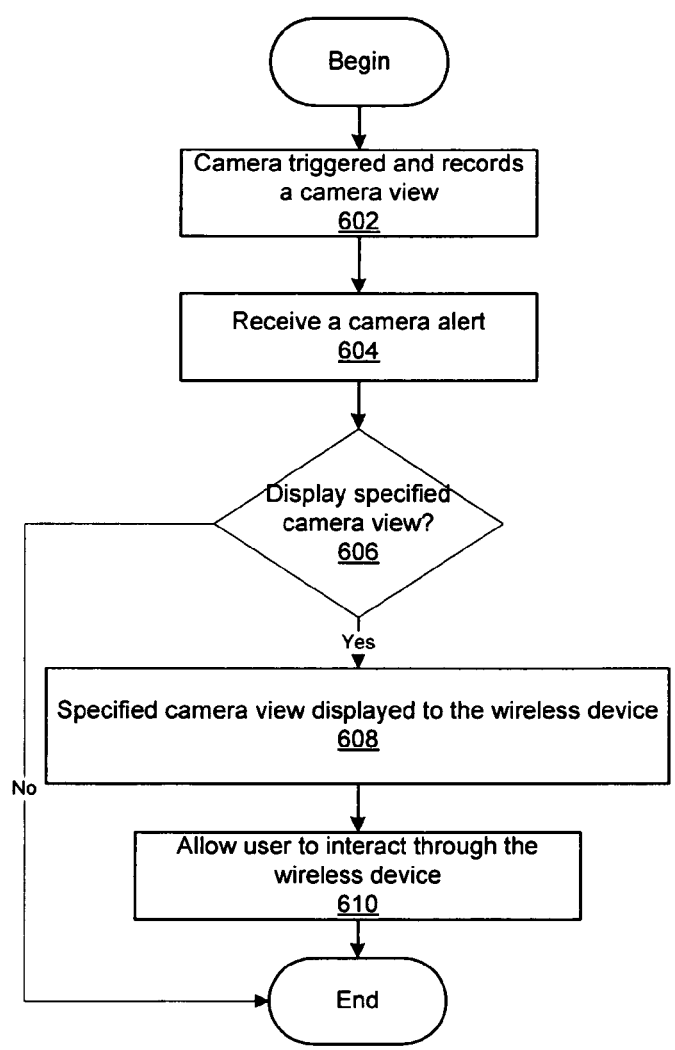
FIG. 6 is a flow chart for a process for interacting with a security system using a cell phone in accordance with the illustrative embodiments of the present invention.

FIG. 6 is a flow chart for a process for interacting with a security system using a cell phone in accordance with the illustrative embodiments of the present invention. The process of FIG. 6 may be implemented by a wireless security system that is interconnected with a wireless device, such as a cell phone. The process begins by a triggered camera recording a camera view [Step 602]. In one embodiment, the camera may be triggered by a doorbell. In another embodiment, the security camera may be motion sensitive for detecting the presence of individuals or motion. In one embodiment, the wireless camera includes on-board memory for storing hours or days of recent content. In other embodiments, the camera view may be recorded to a personal computer, or may be streamed directly to a wireless device. The camera view may be sent in Internet protocol packets or may be sent directly through a cellular network.

Next, the wireless device receives a camera alert [Step 604]. The camera alert may be an audible or touch-sensitive signal, such as a vibration, that indicates that a signal is being received from a wireless camera. Next, the process determines whether to display the specified camera view [Step 606]. The determination of Step 606 is made automatically, or based on user-established options, setting or preferences by user input into the wireless device. For example, once a camera alert is received in Step 604, the user may select to view the camera view or security content by pushing a button, saying a key word or phrase, or otherwise indicating to the wireless device. If the process determines to display the specified camera view, the specified camera view is displayed to the wireless device [Step 608]. The security content may be displayed on one or more displays of the wireless device to show the user who or what is being recorded by the wireless camera.

Next, the process allows the user to interact through the wireless device [Step 610]. In one embodiment, the user may send a text message that is displayed to a doorbell at the home of the user. In another embodiment, the user may use a camera or video recording device of the wireless device to record videos or send streaming data to be received by an individual at the user's doorstep. In yet another embodiment, the user may type a text message and send the text message to a doorbell device using the wireless device. Each embodiment allows the user to interact with an individual or group at the user's home without actually being present. In another embodiment, the user may use the wireless device to grant access to the home of the user by entering a key code or other password that unlocks the door at the user's home. In one embodiment, the security content is automatically displayed by the cell phone without user interaction.

Figure 7:
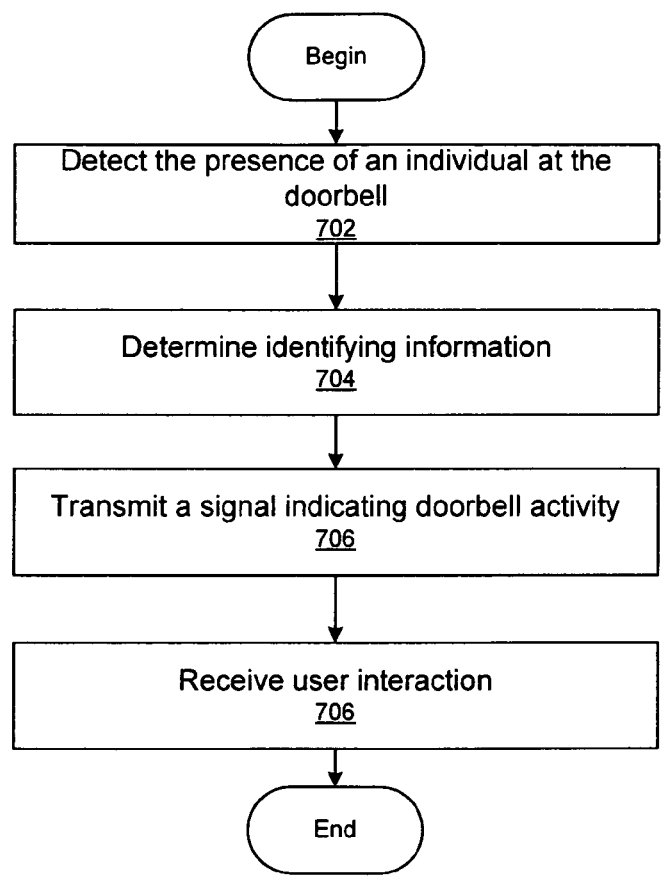
FIG. 7 is a flowchart for a process for sending a doorbell signal in accordance with the illustrative embodiments of the present invention.

FIG. 7 is a flowchart for a process for sending a doorbell signal in accordance with the illustrative embodiments of the present invention. The process of FIG. 7 may be implemented by a home security system and particularly by a security enhanced doorbell. First, the process begins by detecting the presence of an individual at the doorbell [step 702]. The individual may be detected based on a user action, such as pressing the doorbell or speaking. The individual may also be detected based on a pressure sensitive mat, motion detection, laser, infrared, body temperature, or other active detection devices or sensor interconnected with the doorbell.

Next, the doorbell determines identifying information [step 704]. During step 704, the doorbell may use various resources to identify the individual at the door. For example, the doorbell may request that the user give a name, voice identifier, enter a password or text, scan a radio frequency identifier, or pose for a picture or video to be recorded. The doorbell may use this information to identify the individual at the door.

Next, the doorbell transmits a signal indicating doorbell activity [Step 704]. The doorbell activity is detected in Step 702. The signal may be sent by a transceiver of the doorbell. The signal may be sent directly to another device or may be sent through an interconnected wireless network. For example, the signal may be sent to a wired or wireless camera, a set top box, a home router, a home computer, a television, or a cell phone. In one embodiment, the signal may be an alert indicating that the doorbell was pressed. In another embodiment, the signal may activate a wireless camera and set top box for streaming security content to the set top box and connected television. The doorbell may also include a camera that records or streams wireless images from the doorbell as part of the signal. The signal may include or link to security content in the form of an image, recorded video, or streaming video. The signal may also include the identifier determined in Step 704 and information regarding time, date, location, a message from the individual, and/or voice and image recognition data. The signal may be sent as a call, alert, or message.

The doorbell may communicate with a cellular network using a Time Division Multiple Access (TDMA), Code Division Multiple Access (CDMA), Global System for Mobile Communications (GSM) or other similar cellular network. The signal may be routed through the cellular network to the cell phone as a call, message, or alert signal. For example, the signal may be treated like a text message or voicemail that is sent to the cell phone. The signal is routed to the cell phone using gateways, registries, and other cellular components normally used by the cellular network. If necessary the signal may be converted or formatted for compatibility with the cellular network and the cellular phone.

In another embodiment, the signal is sent to a set top box, router, or personal computer that routes the signal to the cellular phone. The signal may need to be routed from an Internet protocol network, such as the Internet, through a Short Message Service (SMS) or text message gateway used by a service provider compatible with the cell phone. For example, the doorbell may communicate the signal over an 802.11g home network to a home router that communicates the signal over the Internet as a SMS message to the cellular phone.

Next, the doorbell receives user interaction [Step 708]. The user interaction may be similar to the interaction described in step 610 of FIG. 6. The user may use the cell phone to speak through the doorbell, send a message, authorize entrance into the home or building, or send other images, video, sound clips or information.

The illustrative embodiments of the present invention provide a system and method for communicating recent content from wireless content. The security content may allow a user to interact with individuals through a set top box and a cell phone. The security content is recorded or streamed to the set top box and cell phone providing the user additional security and peace of mind while not at home. For example, a security system such as security system 300 of FIG. 3 may sporadically record security content based on activity around the home. The recorded security content may be stored to wireless cameras, personal computer, television, digital video recorder, website or other storage device. The user may view the recorded security content based on a received alert or at the user's discretion. For example, the alert may be an email or text message sent to the user indicating new recorded security content has been recorded and is available.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for displaying security content from a set top box to a television, the method comprising:
   receiving media content for display on the television;
   detecting, with the set top box, that one or more cameras have been linked with the set top box;
   in response to detecting the one or more cameras, prompting a user to establish user preferences for each of the one or more cameras, the user preferences including at least one channel selection for displaying security content, wherein a plurality of camera views are displayed in the security content;
   establishing one or more channels for displaying the plurality of camera views, in response to the user selection;
   designating the one or more channels for the one or more camera views;
   receiving, from the user, selections of channels for displaying security content from each of the one or more cameras;
   setting the user preferences to establish how the one or more camera views are displayed to the television;
   receiving an alert from one of the cameras linked with the set top box in response to camera activity; and
   automatically displaying security content received from the camera on the channel selected for that camera according to the user preferences, in response to receiving the alert from the camera.

2. The method according to claim 1, further comprising:
   alerting a user on the television of the alert from the camera for allowing the user to select to see the security content.

3. The method according to claim 1, further comprising:
   displaying the one or more wireless camera views to the user on the television in response to the user selecting a camera view selector.

4. The method according to claim 3, wherein the camera view selector is any of a button on the set top box, television, an indicator on a remote control, and an indicator on a cell phone.

5. The method according to claim 2, wherein the alert is generated by a door bell.

6. The method according to claim 1, wherein the alert is associated with motion detected by the one or more cameras.

7. The method according to claim 1, further comprising:
   recording a camera view when a camera detects activity.

8. A set top box for displaying content from a content provider comprising:
   display components for communicating the content to a television;
   a security module for sending security content to the display components according to user preferences;
   a transceiver for receiving the security content from one or more cameras; and
   an interface for communicating the security content to the display components;
   wherein the set top box is configured to:
      detect that one or more cameras have been linked with the set top box;
      in response to detecting the one or more cameras, prompt a user to establish user preferences for each of the one or more cameras, the user preferences including at least one channel selection for displaying security content, wherein a plurality of camera views are displayed in the security content;
      establish one or more channels for displaying the plurality of camera views, in response to the user selection;
      designate the one or more channels for the one or more camera views;
      receive, from the user, selections of channels for displaying security content from each of the one or more cameras;
      set the user preferences to establish how the one or more camera views are displayed to the television;
      receive an alert from one of the cameras linked with the set top box in response to camera activity; and
      automatically display security content received from the camera on the channel selected for that camera according to the user preferences, in response to receiving the alert from the camera.

9. The set top box according to claim 8, further comprising:
   a cache for storing the security content;
   a format converter for converting the security content to a signal compatible with the television for the display components.

10. The set top box according to claim 8, wherein the content is any of regular television content, video content, and Internet content, and wherein the security module is operable to (1) replace the media content with the received security content, (2) transparently overlay the media content with the received security content, and (3) display the received security content utilizing picture-in-picture, utilizing the user preferences.

11. The set top box according to claim 8, wherein the security content is displayed on the television in response to receiving the alert from the one or more cameras.

12. The set top box according to claim 8, wherein the alert is generated by any of a doorbell, sound sensor, and motion detector.

13. The set top box according to claim 8, further comprising:
   a camera view selector for allowing a user to display the security content.

14. The set top box according to claim 13, wherein the camera view selector is part of a remote control for the set top box.

15. The set top box according to claim 8, wherein the set top box is any of a digital video recorder, a network digital video recorder, a cable television set top box, a satellite set top box, and a set top box for displaying Internet content.

16. A method for displaying security content on a set top box, the method comprising:
   detecting, with the set top box, that one or more cameras have been linked with the set top box;
   in response to detecting the one or more cameras, prompting a user to establish user preferences for each of the one or more cameras, the user preferences including at least one channel selection for displaying security content, wherein a plurality of camera views are displayed in the security content;
   establishing one or more channels for displaying the plurality of camera views, in response to the user selection;
   designating the one or more channels for the one or more camera views;
   receiving, from the user, selections of channels for displaying security content from each of the one or more cameras;
   setting the user preferences to establish how the one or more camera views are displayed to the television;
   recording security content streamed wireless from one of the cameras, in response to camera activity;
   indicating to a user according to user preferences that the security content has been received through at least the camera and recorded; and
   automatically communicating the recorded security content wirelessly to at least one personal wireless device according to the user preferences.

17. The method according to claim 16, wherein the camera activity is any of a doorbell activation, motion detection, sound detection, and presence detection.

18. The method according to claim 16, wherein the security content is enabled to be displayed to a television using a picture in picture display, transparent overlay, and screen replacement in response to the user preferences.

19. The method according to claim 16, wherein the recorded security content is displayed simultaneously to two or more of a television, a computer, and the least one personal wireless device phone according to the user preferences.

* * * * *